United States Patent
Chang et al.

(10) Patent No.: US 9,313,793 B2
(45) Date of Patent: Apr. 12, 2016

(54) SYSTEM AND METHOD TO ALLOCATE FREQUENCY DYNAMICALLY BASED ON PRIORITY OF QUALITY OF EXPERIENCE (QOE) IN 3GPP LTE HETEROGENEOUS NETWORK

(71) Applicant: INTELLECTUAL DISCOVERY CO., LTD., Seoul (KR)

(72) Inventors: Kyung Hi Chang, Seoul (KR); Zeeshan Kaleem, Incheon (KR); Bing Hui, Incheon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 14/229,010

(22) Filed: Mar. 28, 2014

(65) Prior Publication Data

US 2014/0295872 A1  Oct. 2, 2014

(30) Foreign Application Priority Data

Mar. 29, 2013 (KR) .................. 10-2013-0034088

(51) Int. Cl.
   *H04W 72/04* (2009.01)
   *H04W 72/08* (2009.01)
   *H04W 72/10* (2009.01)

(52) U.S. Cl.
   CPC .......... *H04W 72/0486* (2013.01); *H04W 72/10* (2013.01); *H04W 72/0453* (2013.01); *Y02B 60/50* (2013.01)

(58) Field of Classification Search
   CPC .. H04W 72/0486; H04W 72/10; H04W 72/08
   See application file for complete search history.

(56) References Cited

U.S. PATENT DOCUMENTS

| | | | |
|---|---|---|---|
| 2008/0214220 A1* | 9/2008 | Beziot et al. | 455/512 |
| 2009/0247181 A1* | 10/2009 | Palanki et al. | 455/452.2 |
| 2010/0267338 A1* | 10/2010 | Chiu et al. | 455/63.1 |
| 2011/0299488 A1* | 12/2011 | Kim et al. | 370/329 |
| 2012/0082100 A1* | 4/2012 | Ahmadi | H04W 72/1215 370/329 |
| 2013/0225181 A1* | 8/2013 | Radulescu et al. | 455/442 |

FOREIGN PATENT DOCUMENTS

EP  2180739 A1 * 4/2010

* cited by examiner

*Primary Examiner* — Kashif Siddiqui
*Assistant Examiner* — Minjung Kim
(74) *Attorney, Agent, or Firm* — Sughrue Mion, PLLC

(57) ABSTRACT

A method and system to dynamically allocate a frequency based on a priority of quality of experience (QoE) is disclosed. A method to dynamically allocate a frequency may include: securing a predetermined frequency band and a bonus frequency band for a macrocell; allocating the predetermined frequency band and the bonus frequency band to a macro terminal located in the macrocell; allocating the bonus frequency band based on the priority of service in a subsequent time slot when a frequency band comprising the predetermined frequency band and the bonus frequency band is not allocated to the macro terminal.

12 Claims, 6 Drawing Sheets

SYSTEM AND METHOD TO ALLOCATE FREQUENCY DYNAMICALLY BASED ON PRIORITY OF QUALITY OF EXPERIENCE (QOE) IN 3GPP LTE HETEROGENEOUS NETWORK

CROSS-REFERENCE TO RELATED APPLICATION

This application claims the priority benefit of Korean Patent Application No. 10-2013-0034088, filed on Mar. 29, 2013, in the Korean Intellectual Property Office, the disclosure of which is incorporated herein by reference.

BACKGROUND

1. Field of the Invention

Embodiments relate to a method and system to dynamically allocate a frequency to a femto terminal and a macro terminal based on a priority of quality of experience (QoE) to achieve load balancing and interference avoidance that may occur in a heterogeneous network.

2. Description of the Related Art

Locating a transmission end and a reception end to be adjacent to each other is most efficient to improve a capacity of a wireless communication system. A femtocell technology may be an efficient method capable of achieving effects in terms of cost.

The femtocell technology has potential advantages in view of expansion of indoor coverage, energy efficiency, and cost and thus, has been applied to a high speed wireless communication system. Also, a femtocell has been adopted as one of the principal functions of a long term evolution (LTE) system. An LTE femtocell may use all the bands defined in 3rd Generation Partnership Project (3GPP) and may not require an exclusive frequency band. However, due to such reasons, critical co-channel interference (CCI) may occur between a macrocell and a femtocell.

In detail, due to expendability, security, and the limited availability of a backhaul band, substantial interference issues may arise between two hierarchical networks. That is, in view of social communication based or spectrum availability, it may be more effective to use both a macrocell base station and a femtocell base station on the same spectrum. However, to this end, a channel needs to be shared between two hierarchies, which may cause serious interference in a shared channel. Recently, proposed are many methods for solving such interference that may occur in a network in which a femtocell and a macrocell coexist.

Meanwhile, major requirements for a macrocell may be to enable a user to perform communication without using a separate device at any time and at any place, or even during a travel. Many users may be provided with a communication service from each macrocell base station and thus, the communication capacity of the macrocell needs to be preferentially secured compared to the communication capacity of a femtocell. Although inter-layer interference is present against the femtocell, a minimum target signal-to-interference noise ratio (SINR) of a macrocell user may need to be satisfied.

To this end, an amount of power to be decreased at the femtocell needs to be known to satisfy a target SINR of the macrocell user. A relatively small amount of time needs to be used during a process of processing an interference mitigation/cancellation algorithm. Further, an interference mitigation/cancellation method having simple complexity is required to possibly minimize latency. Also, when performing interference mitigation/cancellation, a combination with another resource management is required, such as power and subchannel allocation.

As described above, a femtocell may need to be capable of performing a plurality of measurements in order to be provided with sufficient information for interference mitigation/cancellation between two hierarchical networks and at the same time, to maintain coverage of the femtocell.

For example, a current LTE technology report proposes a variety of options as to an information exchange method between a macrocell and a femtocell. For example, there are an information exchange method using direct broadcasting between a macrocell base station and a femtocell base station, an information exchange method using broadcasting between a macrocell base station and a femtocell base station through a user terminal, an information exchange method between a macrocell base station and a femtocell base station through an X2 based interface that is a signaling protocol between base stations, and an information exchange method between a macrocell base station and a femtocell base station and between femtocell base stations through an S1 based interface that is a signaling protocol between a base station and a gateway.

In this regard, Korean Laid-Open Publication No. 10-2009-0127908, titled "Method and apparatus for controlling interference of base station", discloses a method and apparatus for controlling interference of a femtocell base station using an existing X2 interference control message, instead of newly defining an interference control message in an S1 interface, by converting, to a format based on a protocol of the S1 interface, an X2 interference control message used for an X2 interface and by transmitting the converted X2 interference control message through the SI interface, in order to control interference occurring in a femtocell environment in which the X2 interface is absent.

SUMMARY

Embodiments provide a method and system to dynamically allocate a frequency based on a priority of quality of experience (QoE) that may employ a dynamic frequency band allocation algorithm based on a priority of QoE to achieve load balancing and interference avoidance.

Embodiments also provide a method and system to dynamically allocate a frequency based on a priority of QoE that may define a bonus frequency band and a frequency band for a cell center area and a cell edge area.

Embodiments also provide a method and system to dynamically allocate a frequency based on a priority of QoE that may employ a priority of service as a criterion for a channel allocation procedure configured as one of self organizing network (SON) functions in a femto base station.

Embodiments also provide a method and system to dynamically allocate a frequency based on a priority of QoE that may sacrifice a user terminal having a relatively low priority of service between a macro terminal and a femto terminal, in a specific case.

According to an aspect of embodiments, there is provided a method to dynamically allocate a frequency based on a priority of QoE, the method including: securing a predetermined frequency band and a bonus frequency band for a macrocell; allocating the predetermined frequency band and the bonus frequency band to a macro terminal located in the macrocell; and allocating the bonus frequency band based on the priority of service in a subsequent time slot when a frequency band including the predetermined frequency band and the bonus frequency band is not allocated to the macro terminal.

The securing may include securing all the bonus frequency bands for a center area of the macrocell.

The allocating of the predetermined frequency band and the bonus frequency band may include: receiving a request for using the bonus frequency band from the macro terminal to which the predetermined frequency band is not allocated; and allocating the bonus frequency band to the macro terminal when the bonus frequency band is available.

The allocating of the predetermined frequency band and the bonus frequency band may include: verifying whether another available bonus frequency band is present when the bonus frequency band is occupied by a macro terminal to which the bonus frequency band is allocated and located in a center area of the macrocell; and allocating the other available bonus frequency band to the macro terminal to which the bonus frequency band is allocated when the other available bonus frequency band is present, and allocating the bonus frequency band to the macro terminal.

The allocating of the bonus frequency band based on the priority of service may include preferentially allocating the bonus frequency band to a user terminal having a relatively high priority of service between the macro terminal and a femto terminal in the subsequent time slot.

According to another aspect of embodiments, there is provided a method to dynamically allocate a frequency based on a priority of QoE, the method including: securing, for a femtocell, a frequency band distinguished from a frequency band allocated to a macro terminal that is located in the same area of a macrocell; allocating a bonus frequency band to a femto terminal in a state in which all the frequency bands secured for the femtocell are occupied; and allocating the bonus frequency band based on the priority of service when a frequency band including the predetermined frequency band and the bonus frequency band is not allocated to the femto terminal.

The securing may include securing, for the femtocell, a frequency band secured for another area of the macrocell.

The allocating of the bonus frequency band to the femtocell may include: verifying an available bonus frequency band in response to an additional frequency band request received from the femto terminal; and allocating the available bonus frequency band to the femto terminal.

The allocating of the bonus frequency band based on the priority of service may include allocating the bonus frequency band to a user terminal having a relatively high priority of service between the femto terminal and the macro terminal in a subsequent time slot.

According to still another aspect of embodiments, there is provided a system to dynamically allocate a frequency based on a priority of QoE, the system including: a macro terminal configured to transmit a request for using a bonus frequency band when a predetermined frequency band is not allocated to the macro terminal; a macro base station configured to allocate the predetermined frequency band and the bonus frequency band corresponding to the request to the macro terminal located in a macrocell, and to allocate the bonus frequency band to the macro terminal based on the priority of service in a subsequent time slot when a frequency band including the predetermined frequency band and the bonus frequency band is not allocated to the macro terminal; a femto terminal configured to transmit an additional frequency band request; and a femto base station configured to secure, for a femtocell, a frequency band different from the predetermined frequency band and the bonus frequency band allocated to the macro terminal, to allocate the bonus frequency band to the femto terminal in response to the additional frequency band request, and to allocate the bonus frequency band to the femto terminal based on the priority of service when the frequency band including the predetermined frequency band and the bonus frequency band is not allocated to the femto terminal.

In response to the request for using the bonus frequency band, the macro base station may be configured to allocate the bonus frequency band to the macro terminal when the bonus frequency band is available.

When another available bonus frequency band is present in a state in which the bonus frequency band is occupied by a macro terminal to which the bonus frequency band is allocated and located in a center area of the macrocell, the macro base station may be configured to allocate the other available bonus frequency band to the macro terminal to which the bonus frequency band is allocated, and to allocate the bonus frequency band to the macro terminal.

When the frequency band including the predetermined frequency band and the bonus frequency band is not allocated to the macro terminal, the macro base station may be configured to preferentially allocate the bonus frequency band to a macro terminal having a relatively high priority of service in the subsequent time slot.

The femto base station may be configured to secure, for the femtocell, the frequency band secured for another area of the macrocell.

The femto base station may be configured to allocate an available bonus frequency band to a femto terminal having a relatively high priority of service in a subsequent time slot when the frequency band including the predetermined frequency band and the bonus frequency band is not allocated to the femto terminal.

According to still another aspect of embodiments, there is provided a non-transitory computer-readable storage medium storing at least one program including instructions, to implement a method to dynamically allocate a frequency based on a priority of QoE.

Effects

According to embodiments, it is possible to minimize interference between different networks by employing a dynamic frequency band allocation algorithm based on a priority of quality of experience (QoE) to achieve load balancing and interference avoidance.

Also, according to embodiments, it is possible to increase a frequency reuse rate by minimizing inter-cell interference (ICI) through a frequency reuse pattern with the assumption that a macro system and a femto system coexist.

Also, according to embodiments, it is possible to minimize interference from a femto base station against a macro terminal by defining a bonus frequency band and a frequency band for a cell center area and a cell edge area.

Also, according to embodiments, it is possible to simultaneously guarantee interference mitigation and QoE, and to enhance a network capacity and an outage probability.

Also, according to embodiments, it is possible to enhance quality of service (QoS) of the entire system by sacrificing a user terminal having a relatively low priority of service between a macro terminal and a femto terminal, in a specific case.

BRIEF DESCRIPTION OF THE DRAWINGS

These and/or other aspects, features, and advantages of the embodiments will become apparent and more readily appreciated from the following description of exemplary embodiments, taken in conjunction with the accompanying drawings of which.

DETAILED DESCRIPTION

Figure 1:
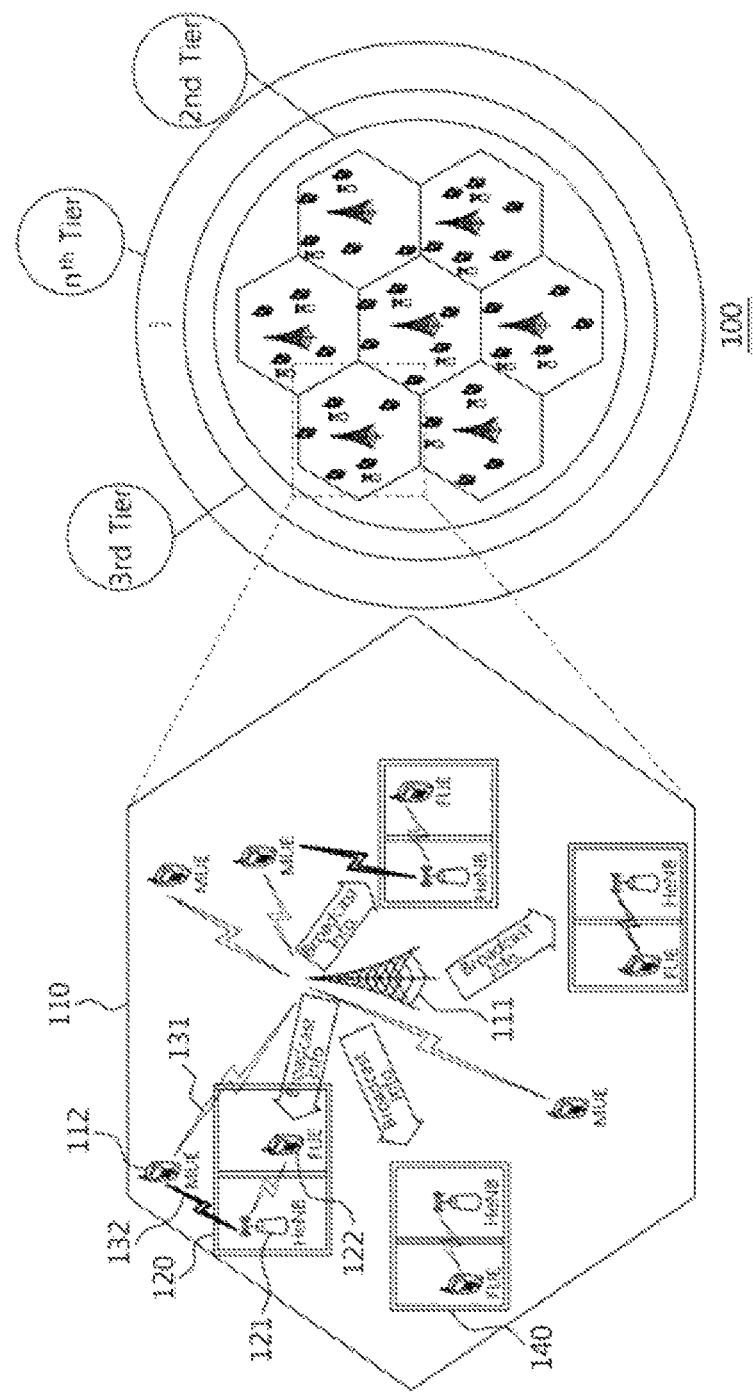
FIG. 1 illustrates an example of interference in a 3rd Generation Partnership Project (3GPP) long term evolution (LTE) heterogeneous network environment according to an embodiment.

Reference will now be made in detail to exemplary embodiments, examples of which are illustrated in the accompanying drawings, wherein like reference numerals refer to like elements throughout. Exemplary embodiments are described below to explain the embodiments by referring to the figures.

A long term evolution (LTE) system may be developed and commercialized as a home femtocell installed within a house and an indoor femtocell to assist a hotspot in a building. Also, the LTE system may be additionally expanded to a street-level femtocell and thereby cope with heavy increases in wireless data of many hotspots.

Such femtocell technology may be very effective in terms of enhancement in a cell yield, expansion of cell coverage, energy efficiency, and cost. The LTE system may also adopt a femtocell as one of the principal network constituent elements. For example, the femtocell may be commercialized in a further evolved form in an LTE-Advanced system that is a fourth generation mobile communication system following the LTE system.

Here, an LTE femtocell may use all the bands defined in a 3rd Generation Partnership Project (3GPP) and may not require an exclusive femtocell frequency band, which may cause critical co-channel interference (CCI) between femtocells.

For example, in an LTE environment, particularly, in a downlink of a hierarchical network in which a macro base station, for example, an evolved node base (eNB) and a femto base station, for example, a home evolved node base (HeNB) coexist, interference from the femto base station against a macro terminal, for example, a macro user equipment (MUE) may arise. Also, the entire bandwidth is shared between femtocells and thus, when the same channel is reused between neighboring femtocells, interference may occur, which may lead to degrading the performance of a system.

Accordingly, technology capable of managing CCI in view of frequency division and time division of resources and power allocation is required to control CCI in a network in which a femtocell is present. In general, a frequency reuse method not considering in-cell or sector traffic load may be used. Here, when traffic load is insignificant, a pre-allocated frequency band may be used, which may lead to decreasing the frequency efficiency.

According to an embodiment, in a downlink of a hierarchical network in which an LTE macro base station and a femto base station coexist, a frequency may be allocated to each terminal dynamically based on a priority of QoE in order to achieve load balancing and to avoid ICI from a femto base station against a macro terminal.

A dynamic frequency allocation according to an embodiment may be applied to all the mobile communication systems configured in different networks having different cell coverage. For example, the dynamic frequency allocation may be effective in a heterogeneous network including a macrocell that includes a macro base station and a femtocell that includes a femto base station in the LTE system, and all the services supported in the heterogeneous network. For example, the services may refer to a variety of services having different priority of service, such as requirements for a packet error rate (PER) and latency.

In detail, L1 (layer 1) of a femto base station system may collect necessary information and configure a dynamic frequency band allocation algorithm that is one of self-organizing network (SON) functions on L2 (layer 2) and L3 (layer 3) software. In addition, a power control procedure according to an embodiment may be employed in any country in which an LTE system providing a variety of services such as voice, video, a runtime service, and a best service is commercialized.

Hereinafter, in the present specification, assigning a frequency to a terminal to perform communication may indicate allocating a frequency band to a terminal. Also, that a base station secures a frequency for a terminal that is to be potentially located in each area of a cell may be expressed as securing a frequency for a corresponding area.

Throughout the specification and the accompanying drawings, a user terminal and a user equipment (UE) may be interchangeably used, a macro base station and an evolved node base (eNB) may be interchangeably used, a femto base station and a home evolved node base (HeNB) may be interchangeably used, a macro terminal and a macro user equipment (MUE) may be interchangeably used, and a femto terminal and a femto user equipment (FUE) may be interchangeably used.

Hereinafter, embodiments are described with reference to the accompanying drawings.

FIG. 1 illustrates an example of interference 132 in a 3GPP LTE heterogeneous network environment 100 according to an embodiment. Referring to FIG. 1, an interference circumstance may be under a heterogeneous network including a macro base station 111, a femto base station 121, a macro terminal 112, and a femto terminal 122 in a 3GPP LTE. According to an embodiment, the macro base station 111 and the macro terminal 112 may be connected to each other through a link 131.

For example, a femtocell 120 may use all the bands defined in the 3GPP and may not require an exclusive frequency band for the femtocell 120. Accordingly, critical CCI may occur between a macrocell 110 and the femtocell 120, and between femtocells 120 and 140.

According to an embodiment, a fractional frequency reuse (FFR) dynamic frequency allocation may be applied so that each of a macro system and a femto system may avoid the interference 132 using a partial band through frequency division. By applying such dynamic frequency allocation, the interference 132 from the femto base station 121 against the macro terminal 112 in a downlink may be minimized.

According to an embodiment, the femto terminal 122 registered to the femto base station 121 may be assumed as a closed subscriber group (CSG) capable of using the corresponding femto base station 121. Accordingly, the macro terminal 112 that is not registered to the femto base station 121 and located to be around the femto base station 121 may receive the interference 132, for example, downlink interference from the neighboring femto base station 121.

According to an embodiment, the femto base station 121 may include a downlink receiver configured to perform functionalities, such as a network listen mode (NLM), a radio environment measurement (REM), and an HeNB sniffer. The femto base station 121 may obtain control channel information that is broadcast from the macro base station 111 to the macro terminal 112 through the downlink receiver.

According to an embodiment, the femto base station 121 may include an uplink receiver configured to receive information of the macro terminal 112, for example, a high interference indicator (HII) report that is transmitted from the macro terminal 112 in an interference circumstance to the macro base station 111.

According to an embodiment, to achieve load balancing and interference avoidance, the interference 132 between the different networks using a dynamic frequency band allocation algorithm based on a priority of QoE may be minimized.

According to an embodiment, it is possible to increase a frequency reuse rate by minimizing interference between areas through a frequency reuse pattern in which a macro system and a femto system are assumed to coexist, and at the same time, to minimize the interference 132 from the femto base station 121 against the macro terminal 112 by defining a bonus frequency band and a frequency band for a cell center area and a cell edge area.

According to an embodiment, by applying, as a criterion, a priority of service to a channel allocation procedure that is configured as one of SON functions at the femto base station 121, it is possible to guarantee interference mitigation and QoE and to enhance a network capacity and an outage probability.

According to an embodiment, in a specific case, it is possible to enhance a QoS of the entire system by sacrificing a user terminal having a relatively low priority of service between the macro terminal 112 and the femto terminal 122.

According to an embodiment, although only a macro system including only the macro base station 111 and the macro terminal 112 is present, it is possible to configure a system having the enhanced performance through a dynamic frequency band allocation algorithm at the macro base station 111.

Figure 2:
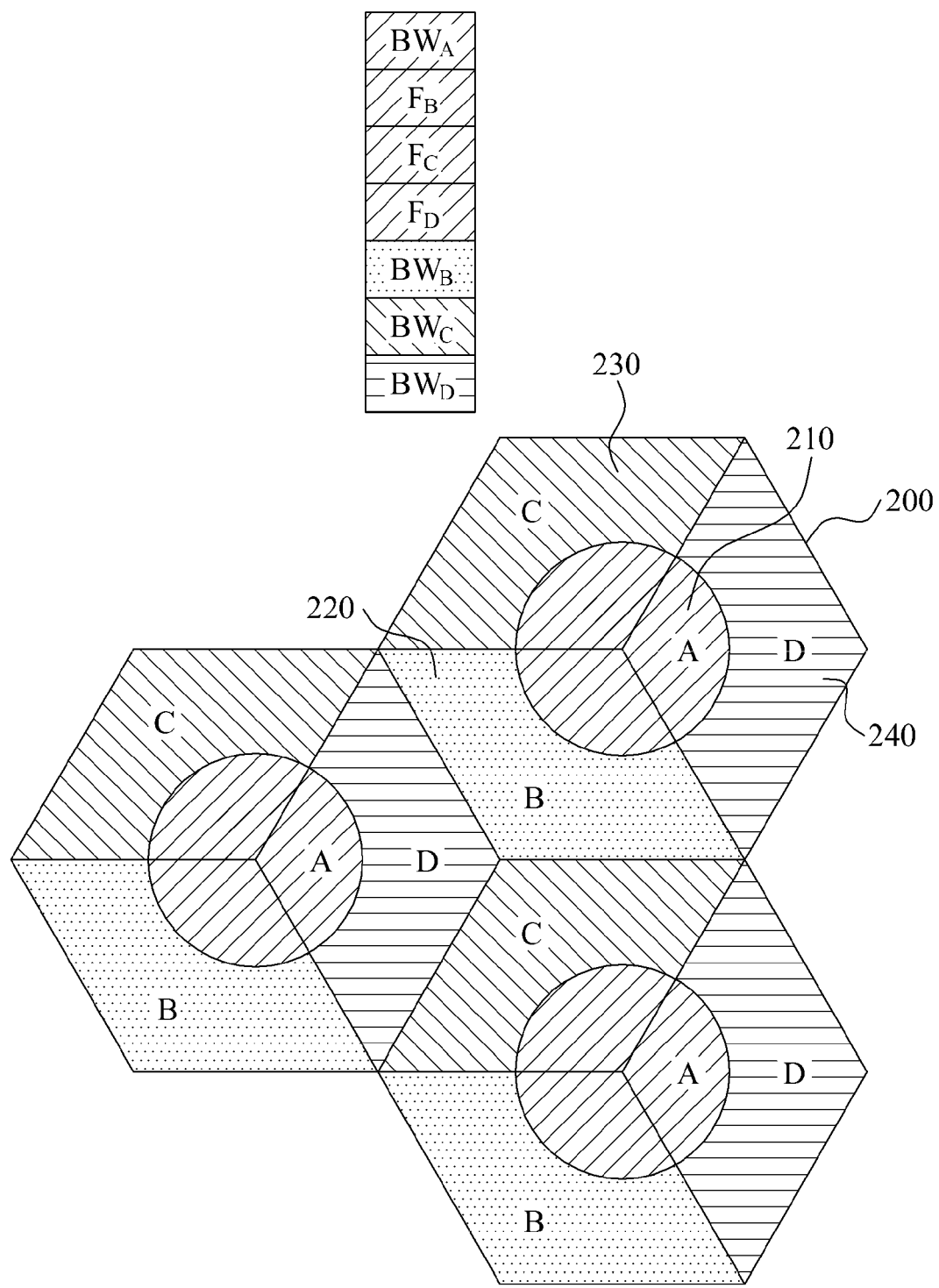
FIG. 2 illustrates an example of fractional frequency reuse (FFR) frequency division based on traffic load and an area size in a macrocell according to an embodiment.

FIG. 2 illustrates an example of FFR frequency division based on traffic load and an area size in a macrocell 200 according to an embodiment.

Referring to FIG. 2, a center area of the macrocell 200 may be represented as A 210, and remaining three areas of the macrocell 200 may be represented as B 220, C 230, and D 240, respectively. Here, B 220, C 230, and D 240 may be edge areas. For example, a predetermined frequency band allocated to a user terminal UE located in an area X including the center area A 210 and the edge areas B 220, C 230, and D 240 may be represented as $BW_X$. Also, a bonus frequency band dynamically allocated to a user terminal based on requirements, availability, and priority of the user terminal may be represented as $F_Y$. Here, Y may include the edge areas B 220, C 230, and D 240 excluding the center area A 210.

For example, although no predetermined bonus frequency band is secured for the center area A 210, all the bonus frequency bands may be secured for the center area A 210 in an initial stage. Here, the secured bonus frequency band may be allocated to a femto terminal or a macro terminal using a method to dynamically allocate a frequency based on a priority of QoE.

According to an embodiment, a bonus frequency band may be allocated to the edge areas B 220, C 230, and D 240 of the macrocell 200 based on requirements of a user terminal located at a cell edge. The dynamic frequency allocation will be further described with reference to FIGS. 4 and 5. Using the aforementioned FFR scheme, it is possible to increase a frequency reuse rate by minimizing interference between areas and to flexibly allocate a frequency in an area. Here, macro terminals may be assumed to be uniformly distributed within a cell.

According to an embodiment, frequency bands may be secured for the center area A 210 and the edge areas B 220, C 230, and D 240 to allocate a frequency band to a user terminal, as expressed by Equation 1 and Equation 2.

$$BW_A = \left[(BW_{total} - F_Y)\left(\frac{r_{int}}{R}\right)^2\right] \quad \text{[Equation 1]}$$

$$BW_X = \left\lfloor \frac{[(BW_{total} - F_Y) - BW_A]}{3} \right\rfloor \quad \text{[Equation 2]}$$

In Equation 1 and Equation 2, $BW_A$ denotes a frequency band secured for the center area A 210 of the macrocell 200, $r_{int}$ denotes a radius of the center area A 210 of the macrocell 200 and may be used to determine a size of $BW_A$, R denotes a radius of the macrocell 200, and $BW_{total}$ denotes a total available frequency band.

$$BW_{total}=BW_A+BW_B+BW_C+BW_D+(F_B+F_C+F_D) \quad \text{[Equation 3]}$$

According to an embodiment, a frequency or a size of a frequency to be secured may be fixed as expressed by Equation 4 and Equation 5 during a one-time dynamic frequency allocation procedure. The one-time dynamic frequency allocation frequency may be performed in a single time slot. For example, a size of a frequency band to be secured for each area may be generally set to be proportional to a size of a corresponding area.

$$BW_A \geq BW_B=BW_C=BW_D \quad \text{[Equation 4]}$$

$$F_B=F_C=F_D \quad \text{[Equation 5]}$$

As described above, macro terminals located in the macrocell 200 may be assumed to be uniformly distributed within the macrocell 200 and a large number of macro terminals may be distributed over a large area. In Equation 5, values of bonus frequency bands $F_B$, $F_C$, and $F_D$ may be determined based on traffic load and an environment of the macrocell 200.

According to an embodiment, frequency bands to be allocated to a macro terminal and a femto area in the respective areas of the macrocell 200 may be expressed by Equation 6 through Equation 9. Here, as illustrated in FIG. 2, a frequency for an FFR may be secured based on a size of an area and traffic load. A frequency band allocated to a femto terminal may be distinguished from a frequency band allocated to a macro terminal in the same area.

Frequency bands allocated to a macro terminal and a femto terminal in the center area A 210 of the macro cell 200 may be expressed by Equation 6.

$$MUE_{initial}=BW_A+(F_B+F_C+F_D)$$

$$MUE_{min}=BW_A$$

$$FUE_{initial}=BW_B+BW_C+BW_D$$

$$FUE_{max}=BW_B+BW_C+BW_D+(F_B+F_C+F_D) \quad \text{[Equation 6]}$$

Frequency bands allocated to a macro terminal and a femto terminal in the edge area B 220 of the macrocell 200 may be expressed by Equation 7.

$$MUE_{initial} = BW_B$$

$$MUE_{max} = BW_B + F_B$$

$$FUE_{initial} = BW_A + BW_C + BW_D$$

$$FUE_{max} = BW_A + BW_C + BW_D + (F_B + F_C + F_D) \quad \text{[Equation 7]}$$

Frequency bands allocated to a macro terminal and a femto terminal in the edge area C 230 of the macrocell 200 may be expressed by Equation 8.

$$MUE_{initial} = BW_C$$

$$MUE_{max} = BW_C + F_C$$

$$FUE_{initial} = BW_A + BW_B + BW_D$$

$$FUE_{max} = BW_A + BW_B + BW_D + (F_B + F_C + F_D) \quad \text{[Equation 8]}$$

Frequency bands allocated to a macrocell and a femtocell in the edge area D 240 of the macrocell 200 may be expressed by Equation 9.

$$MUE_{initial} = BW_D$$

$$MUE_{max} = BW_D + F_D$$

$$FUE_{initial} = BW_A + BW_B + BW_C$$

$$FUE_{max} = BW_A + BW_B + BW_C + (F_B F_C + F_D) \quad \text{[Equation 9]}$$

Figure 3:
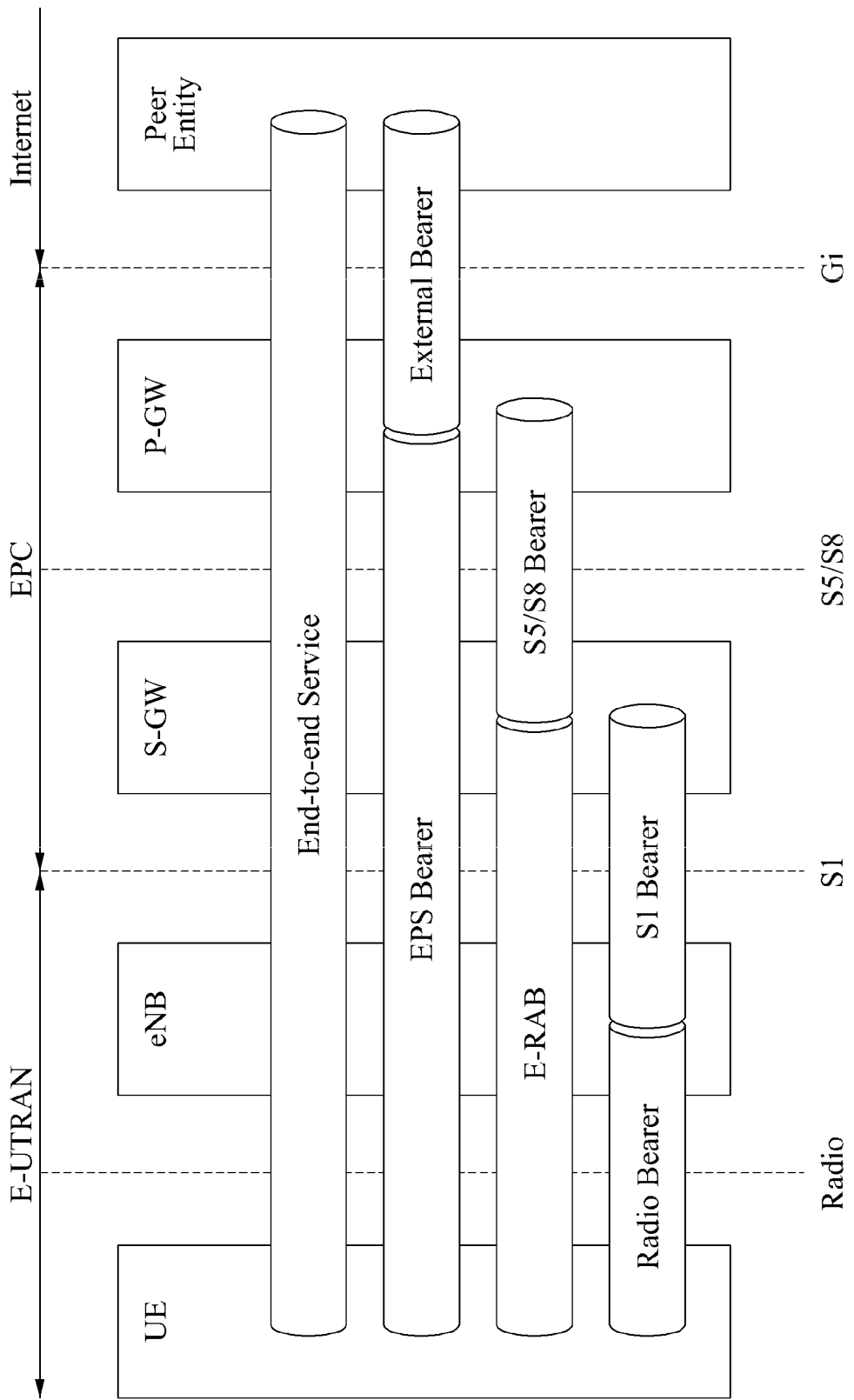
FIG. 3 illustrates an example of an evolved packet system (EPS) bearer service structure according to an embodiment.

FIG. 3 illustrates an EPS bearer service structure according to an embodiment. Here, a priority of service of a user terminal may be defined by a macro base station by referring to a bearer service structure of FIG. 3. Further, the priority of service defined in Table 1 may be used to classify a service based on a QoS class identifier (QCI).

TABLE 1

| QCI | Resource Type | Priority | Packet Delay Budget(ms) | Packet Error Loss Rate | Example Services |
|---|---|---|---|---|---|
| 1 | GBR | 2 | 100 | $10^{-2}$ | Interactive speech |
| 2 | GBR | 4 | 150 | $10^{-3}$ | Interactive video (real-time streaming) |
| 3 | GBR | 5 | 300 | $10^{-6}$ | Non-interactive video (buffer streaming) |
| 4 | GBR | 3 | 50 | $10^{-3}$ | Real-time game |
| 5 | Non-GBR | 1 | 100 | $10^{-6}$ | IMS signal |
| 6 | Non-GBR | 7 | 100 | $10^{-3}$ | Speech, video (streaming), interactive game |
| 7 | Non-GBR | 6 | 300 | $10^{-6}$ | Video (buffer streaming) |
| 8 | Non-GBR | 8 | 300 | $12^{-6}$ | TCP based (Internet), chat, FTP, P2P file sharing, evolved video, and others |
| 9 | Non-GBR | 9 | | | |

Figure 4:
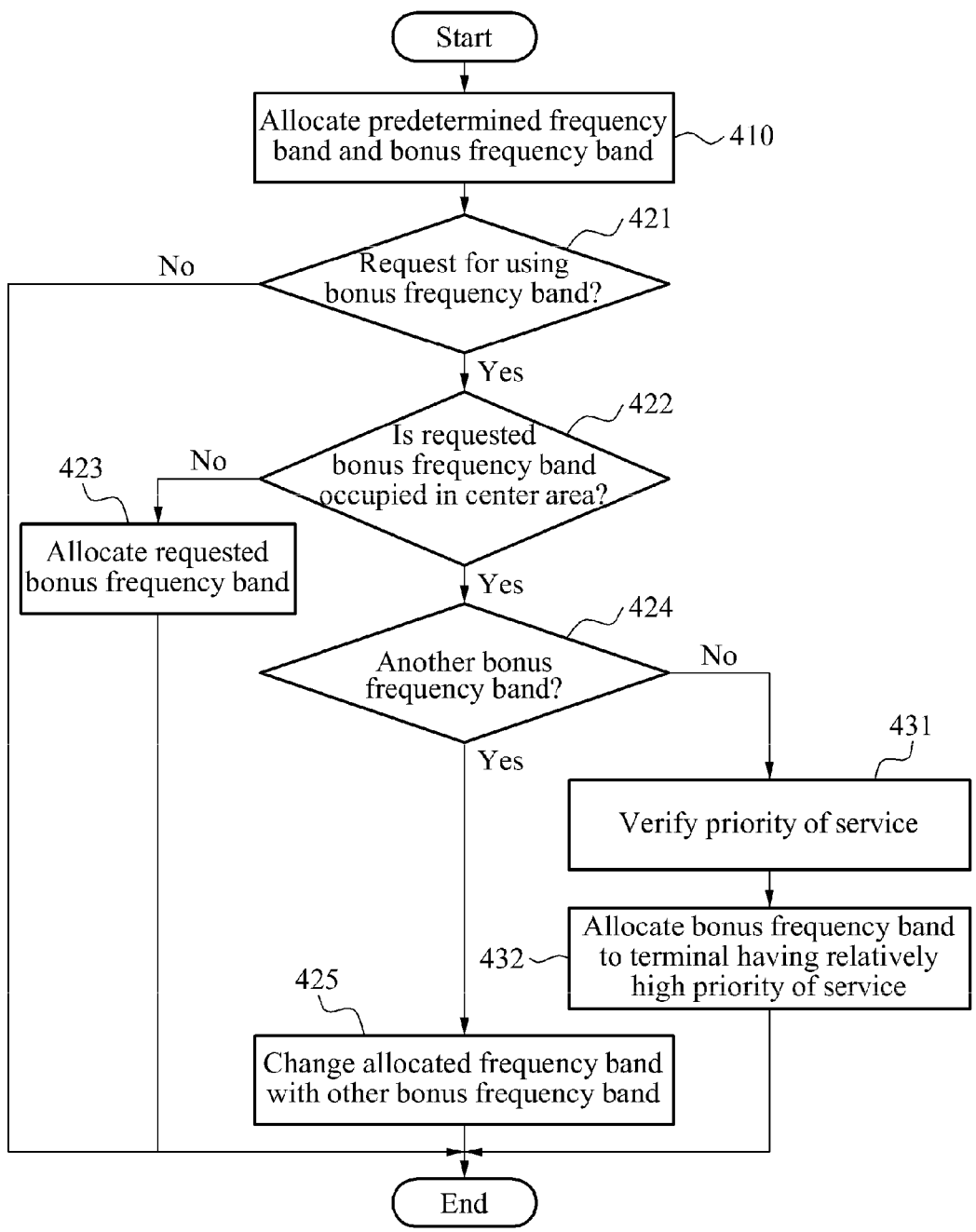
FIG. 4 is a flowchart illustrating a method to dynamically allocate a frequency based on a priority of quality of experience (QoE) in a macro base station according to an embodiment.

FIG. 4 is a flowchart illustrating a method to dynamically allocate a frequency based on a priority of QoE in a macro base station according to an embodiment. Here, the macro base station may perform a load balancing procedure as follows.

In operation 410, the macro base station may allocate a predetermined frequency band and a bonus frequency band to a macro terminal located in each area of a macrocell. For example, the macro base station may preferentially secure the entire bonus frequency bands for a center area of the macrocell, and may additionally secure the predetermined frequency band for each area of the macrocell. In this example, the macro base station may allocate a predetermined frequency band and a bonus frequency band to a macro terminal located in the macrocell.

In operation 421, the macro base station may verify whether a request for using a bonus frequency band is received from a macro terminal within an area including the center area and an edge area within the macrocell. In detail, when the request for using the bonus frequency band is not received from the macro terminal, a corresponding procedure may be terminated. Conversely, when the request for using the bonus frequency band is received from the macro terminal, operation 422 may be performed. The macro base station may receive the request for using the bonus frequency band from a macro terminal to which the predetermined frequency band is not allocated.

When the request for using the bonus frequency band is received from the macro terminal, the macro base station may determine whether the requested bonus frequency band is occupied by the macro terminal located in the center area of the macrocell in operation 422. Here, when the requested bonus frequency band is not occupied by the macro terminal located in the center area of the macrocell, it may indicate that the requested bonus frequency band is available.

When the requested bonus frequency band is available, the macro base station may allocate the requested bonus frequency band to the macro terminal having transmitted the request for using the bonus frequency band in operation 423. For example, when the requested bonus frequency band is available, the macro base station may allocate the requested bonus frequency band to the macro terminal within the corresponding area including the center area and the edge area and may terminate the procedure.

Conversely, when the requested bonus frequency band is unavailable, the macro base station may verify whether another bonus frequency band is present in operation 424. Here, when the bonus frequency band is occupied by a macro terminal to which the bonus frequency band is allocated and located in the center area of the macrocell, the macro base station may verify whether another available bonus frequency is present. In detail, the macro base station may verify whether another frequency band is available within the center area of the macrocell.

When the other bonus frequency band is available within the center area, the macro base station may change the bonus frequency band allocated to the macro terminal with the other available bonus frequency band in operation 425. For example, when another available bonus frequency band is present, the macro base station may allocate the other available bonus frequency band to a macro terminal to which a bonus frequency band is allocated and may allocate the bonus frequency band to the macro terminal. In detail, the macro base station may change the bonus frequency band of the macro terminal occupying the requested bonus frequency band within the center area with the other bonus available frequency band. The macro base station may allocate the requested and currently available bonus frequency band to a macro terminal located in the edge area.

Conversely, when the other bonus frequency band is unavailable within the center area, the macro base station may verify a priority of service with respect to all the macro terminals in operation 431. In detail, the macro base station may verify the priority of service with respect to all the macro terminals that are in competition over a bonus frequency band and may prepare for a case in which a service is terminated and the bonus frequency band becomes available in a subsequent time slot. For example, when a frequency band including the predetermined frequency band and the bonus frequency band is not allocated to a corresponding macro terminal, the macro base station may allocate a bonus frequency band to the corresponding macro terminal based on the priority of service.

In operation 432, the macro base station may preferentially allocate the bonus frequency band to a macro terminal having a relatively high priority of service in a subsequent time slot. In detail, when an available bonus frequency band is present in the subsequent time slot, the macro base station may preferentially allocate the available bonus frequency band to the macro terminal having the relatively high priority of service and may terminate a procedure. Here, a priority of service of a user terminal may be defined by the macro base station by referring to a bearer model of FIG. 3. The priority of service defined in FIG. 3 may be used to classify a service based on a QCI.

Conversely, when the available bonus frequency band is absent in the subsequent time slot, the macro base station may wait for another subsequent time slot and may repeat a process of determining whether a bonus frequency band is available in operation 432.

Figure 5:
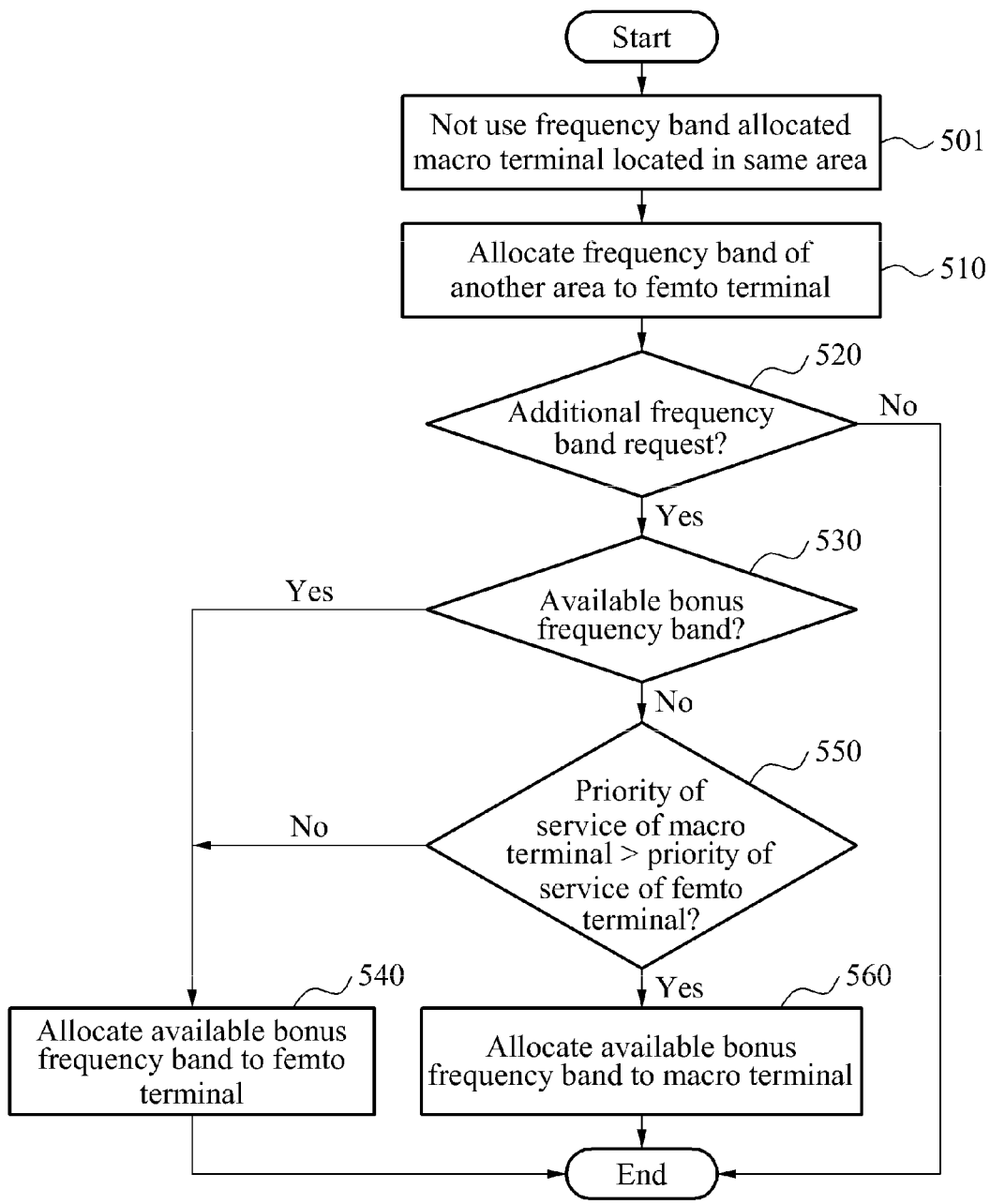
FIG. 5 is a flowchart illustrating a method to dynamically allocate a frequency based on a priority of QoE in a femto base station according to an embodiment.

FIG. 5 is a flowchart illustrating a method to dynamically allocate a frequency based on a priority of QoE in a femto base station according to an embodiment. Here, the femto base station may allocate a frequency to a femto terminal as follows.

In operation 501, the femto base station located in an area of a macrocell including a center area and an edge area may not use a frequency band allocated to a macro terminal located in the same area, to avoid interference.

In operation 510, the femto base station may allocate a frequency of another area to the femto terminal. For example, the femto base station may secure, for a femtocell, a frequency band distinguished from the frequency band allocated to the macrocell located in the same area. The femto base station may secure, for the femtocell, a frequency band allocated to an area different from the area including the femtocell.

In operation 520, the femto base station may verify whether an additional frequency band request is received. In detail, in a state in which all the secured frequency bands are occupied by the femto terminal, the femto base station may verify whether a femto terminal requiring the additional frequency band is present by determining whether the additional frequency band request is received.

When the additional frequency band request is received, the femto base station may verify whether an available bonus frequency band is present in operation 530. For example, the femto base station may verify whether an available bonus frequency band is present, in response to the additional frequency band request.

When the available bonus frequency band is present, the femto base station may allocate the available bonus frequency band to the femto terminal having transmitted the additional frequency band request in operation 540. For example, in a state in which all the frequency bands secured for the femtocell are occupied, the femto base station may allocate the available bonus frequency band to the femto terminal.

Conversely, when the available bonus frequency band is absent, the femto base station may verify a priority of service with respect to all the macro terminals and femto terminals that are in competition over the bonus frequency band in operation 550. Here, the femto base station may prepare for a case in which a service is terminated and the bonus frequency band becomes available in a subsequent time slot. In detail, when a frequency band including the predetermined frequency band and the bonus frequency band is not allocated to the femto terminal, the femto base station may allocate a bonus frequency band based on a priority of service.

When the priority of service of the macro terminal is above the priority of service of the femto terminal, the femto terminal may preferentially allocate, to the macro terminal, an available bonus frequency band that is likely to occur in the subsequent time slot in operation 560. Here, when the available bonus frequency band does not occur in the subsequent time slot, the femto base station may determine whether the bonus frequency band becomes available in another next time slot.

Conversely, when the priority of service of the femto terminal is above the priority of service of the macro terminal, the femto base station may preferentially allocate, to the femto terminal, the available bonus frequency band that is likely to occur in the subsequent time slot. Here, when the available bonus frequency band does not occur in the subsequent time slot, the femto base station may determine whether the bonus frequency band becomes available in another next time slot.

Conversely, when the additional frequency band request is not received in operation 520, a frequency allocation procedure may be terminated.

Figure 6:
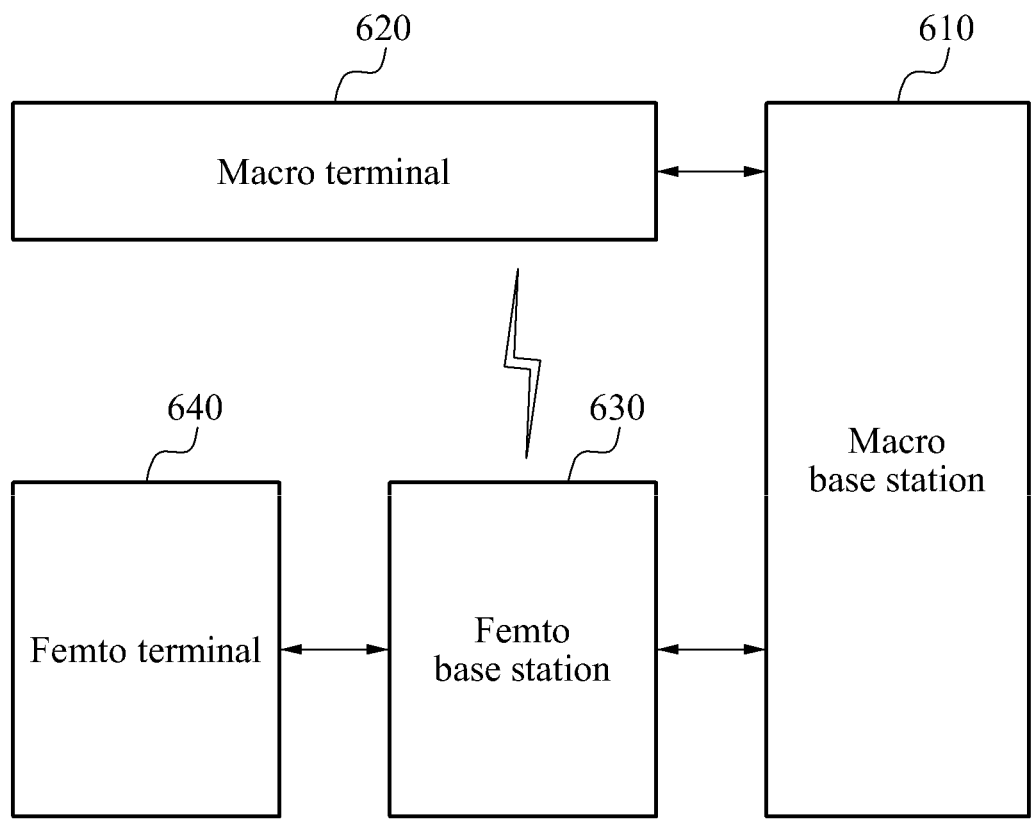
FIG. 6 is a block diagram illustrating a system to dynamically allocate a frequency based on a priority of QoE according to an embodiment.

FIG. 6 is a block diagram illustrating a system 600 to dynamically allocate a frequency based on a priority of QoE according to an embodiment. Referring to FIG. 6, the system 600 may include a macro base station 610, a macro terminal 620, a femto base station 630, and a femto terminal 640.

The macro base station 610 may allocate a predetermined frequency and a bonus frequency band corresponding to the request to the macro terminal 620 located in a macrocell. When a frequency band including the predetermined frequency band and the bonus frequency band is not allocated to the macro terminal 620, the macro base station 610 may allocate the bonus frequency band based on a priority of service in a subsequent time slot. In detail, the macro base station 610 may allocate a frequency band to the macro terminal 620 through a process similar to FIG. 4.

When the predetermined frequency band is not allocated to the macro terminal 620, the macro terminal 620 may transmit a request for using a bonus frequency band.

The femto base station 630 may secure, for a femtocell, a frequency band different from the predetermined frequency band allocated to the macro terminal 620. When an additional frequency band request is received, the femto base station 630 may allocate the bonus frequency band to the femto terminal 640. When a frequency band including the predetermined frequency band and the bonus frequency band is not allocated to the femto terminal 640, the femto base station 630 may allocate the bonus frequency band to the femto terminal 640 based on a priority of service. In detail, the femto base station 630 may allocate the frequency band to the femto terminal 640 through a process similar to FIG. 5.

The femto terminal 640 may transmit the additional frequency band request.

According to an embodiment, the macro base station 610 may include a non-transitory computer-readable storage media storing at least one program including commands to perform the method to dynamically allocate a frequency band of FIG. 4. According to another embodiment, the femto base station 630 may include a non-transitory computer-readable storage media storing at least one program including commands to perform the method to dynamically allocate a frequency band.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments of have been shown and described, the present disclosure is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method to dynamically allocate a frequency band, the method comprising:
   securing a first predetermined frequency band for a center area of a macrocell and all bonus frequency bands allocable to edge areas of the macrocell for the center area of the macrocell at an initial stage;
   receiving a request for using a bonus frequency band among the bonus frequency bands secured for the center area of the macrocell from a first macro terminal located in an edge area of the macrocell;
   determining availability of the bonus frequency band based on occupation of the bonus frequency band by second macro terminals located in the center area of the macrocell in response to the request; and
   allocating the bonus frequency band to the first macro terminal based on whether the bonus frequency band is available,
   wherein the first macro terminal includes a macro terminal, to which a second predetermined frequency band for the same area as the edge area in which the first macro terminal is located, is not allocated.

2. The method of claim 1, wherein the allocating of the bonus frequency band comprises:
   verifying whether another available bonus frequency band is present when the bonus frequency band is occupied by a macro terminal to which the bonus frequency band is allocated and located in the center area of the macrocell; and
   allocating the other available bonus frequency band to the macro terminal to which the bonus frequency band is allocated when the other available bonus frequency band is present, and allocating the bonus frequency band to the first macro terminal.

3. The method of claim 1, wherein the allocating of the bonus frequency band comprises preferentially allocating the bonus frequency band to a user terminal having a relatively high priority of service among the first macro terminal, the second macro terminals and femto terminals located in the edge areas of the macrocell in a subsequent time slot when the bonus frequency band is not available in the present time slot.

4. A method to dynamically allocate a frequency band, the method comprising:
   securing a predetermined frequency band for a first edge area and a center area of a macrocell for a femtocell at an initial stage wherein the first edge area is different from a second edge area of the macrocell in which the femtocell is located;
   determining whether the predetermined frequency band is available for a first femto terminal located in the second edge area;
   receiving a request of using a bonus frequency band from the first femto terminal when the predetermined frequency band is not available for the first femto terminal wherein the bonus frequency band is secured for edge areas of the macrocell;
   determining whether the bonus frequency band is available based on occupation of macro terminals located in the second edge area and second femto terminals located in the edge areas of the macrocell in response to the request; and
   allocating the bonus frequency band to the first femto terminal based on whether the bonus frequency band is available.

5. The method of claim 4, wherein the allocating the bonus frequency band to the first femto terminal comprises:
   verifying an available bonus frequency band in response to an additional frequency band request received from the first femto terminal; and
   allocating the available bonus frequency band to the first femto terminal.

6. The method of claim 4, wherein the allocating the bonus frequency band to the first femto terminal comprises allocating the bonus frequency band to a user terminal having a relatively high priority of service among the first femto terminal, the second femto terminals located in the edge areas and the macro terminals located in the second edge area in a subsequent time slot when the bonus frequency is not available in the present time slot.

7. A system to dynamically allocate a frequency band, the system comprising:
   a macro terminal transmitting a request for using a bonus frequency band secured for a center area of a macrocell when a first predetermined frequency band is not allocated to the macro terminal wherein the first predetermined frequency band and the bonus frequency band allocable to edge areas of the macrocell are secured for the center area of the macrocell at an initial stage;
   a macro base station determining an availability of the bonus frequency band based on occupation of the bonus frequency band by macro terminals different from the macro terminal and allocating the bonus frequency band to the macro terminal based on availability of the bonus frequency band;
   a femto terminal transmitting a request for using the bonus frequency band when a second predetermined frequency band is not allocated to the femto terminal wherein the second predetermined frequency band for an edge area of the macrocell in which the femtocell is not located is secured for the femtocell at an initial stage; and
   a femto base station determining the availability of the bonus frequency band based on occupation of the bonus frequency band by macro terminals located in the same area as the femto terminal in response to the request from the femto terminal and allocating the bonus frequency band to the femto terminal based on availability of the bonus frequency band.

8. The system of claim 7, wherein, in response to the request for using the bonus frequency band, the macro base station is configured to allocate the bonus frequency band to the macro terminal when the bonus frequency band is available.

9. The system of claim 8, wherein when another available bonus frequency band is present in a state in which the bonus frequency band is occupied by a macro terminal to which the bonus frequency band is allocated and located in the center area of the macrocell, the macro base station is configured to allocate the other available bonus frequency band to the macro terminal to which the bonus frequency band is allocated, and to allocate the bonus frequency band to the macro terminal.

10. The system of claim 7, wherein when the frequency band comprising the first predetermined frequency band and the bonus frequency band is not allocated to the macro terminal, the macro base station is configured to preferentially allocate the bonus frequency band to a macro terminal having a relatively high priority of service in the subsequent time slot.

11. The system of claim 7, wherein the femto base station is configured to secure, for the femtocell, the frequency band secured for another area of the macrocell.

12. The system of claim 7, wherein the femto base station is configured to allocate an available bonus frequency band to a femto terminal having a relatively high priority of service in a subsequent time slot when the frequency band comprising the second predetermined frequency band and the bonus frequency band is not allocated to the femto terminal.

\* \* \* \* \*